United States Patent [19]
Doran et al.

[11] Patent Number: 6,097,524
[45] Date of Patent: Aug. 1, 2000

[54] OPTICAL COMMUNICATION SYSTEMS

[75] Inventors: Nicholas John Doran, Coventry; Peter Neil Kean; Finlay MacDonald Knox, both of Birmingham, all of United Kingdom

[73] Assignee: BTG International Limited, London, United Kingdom

[21] Appl. No.: 08/971,981

[22] Filed: Nov. 17, 1997

Related U.S. Application Data

[63] Continuation of application No. PCT/GB96/01172, May 16, 1996.

[30] Foreign Application Priority Data

May 17, 1995 [GB] United Kingdom .................. 9509938

[51] Int. Cl.[7] ............................. H04B 10/18; H04B 10/17
[52] U.S. Cl. ......................... 359/179; 359/337; 359/341
[58] Field of Search .................................. 359/160, 161, 359/176, 179, 173, 174, 337, 341, 347; 385/1, 122

[56] References Cited

U.S. PATENT DOCUMENTS

| | | | |
|---|---|---|---|
| 4,778,237 | 10/1988 | Sorin et al. ........................ | 350/96.15 |
| 5,488,620 | 1/1996 | Minden ..................................... | 372/18 |
| 5,577,057 | 11/1996 | Frisken ..................................... | 372/18 |
| 5,629,795 | 5/1997 | Suzuki et al. ........................... | 359/161 |
| 5,798,853 | 8/1998 | Watanabe ................................ | 359/160 |
| 5,828,478 | 10/1998 | Thomine et al. ....................... | 359/181 |
| 5,898,716 | 4/1999 | Ahn et al. ................................ | 372/6 |

FOREIGN PATENT DOCUMENTS 2279838  1/1995  United Kingdom .

OTHER PUBLICATIONS

Chen et al, "Soliton Fiber Ring Laser", Optics Letters, vol. 17, No. 6, pp. 417–419, Mar. 15, 1992.

Kawai et al, "10Gbit/s optical soliton transmission over 7200 km by using a monolithically integrated MQW–DFB–LD/MQW–EA modlator light source", Electronics Letters, Feb. 3, 1994, pp. 251–252.

*Primary Examiner*—Leslie Pascal
*Attorney, Agent, or Firm*—Pillsbury Madison & Sutro LLP

[57] ABSTRACT

A return-to-zero pulse optical communication system includes fast saturable absorber means (F1,DSF) to provide substantially zero average dispersion in a single amplifier span (SIF,DSF) to reduce the effect of timing jitter an provide considerably enhanced propagation distances.

14 Claims, 2 Drawing Sheets

OPTICAL COMMUNICATION SYSTEMS

This is a Continuation of International Appln. No. PCT/GB96/01172 filed May 16, 1996 which designated the U.S.

FIELD OF THE INVENTION

This relates to optical communication systems and finds particular application to optical communication systems for long distance operation or trans-oceanic applications.

BACKGROUND OF RELATED ART

Currently a great deal of work is being done on soliton propagation for such above-mentioned systems. However, such soliton systems suffer from Gordon-Haus timing jitter. Return-to-zero (RZ) pulses are desired as they are compatible with the all-optical processing technologies envisaged for switching nodes and routing devices.

SUMMARY OF THE INVENTION

We have found that RZ pulse propagation may be advantageously employed where the average dispersion is near zero in a single amplifier span, thus reducing the timing jitter, with the use of a saturable absorber to maintain the pulse shape.

According to the present invention there is provided a return-to-zero pulse optical communication system including fast saturable absorber means with propagation near the average dispersion zero wavelength.

BRIEF DESCRIPTION OF THE DRAWINGS

Embodiments of the invention will be particularly described with reference to the accompanying drawings in which.

DETAILED DESCRIPTION OF THE PREFERRED EMBODIMENT

Figure 1:
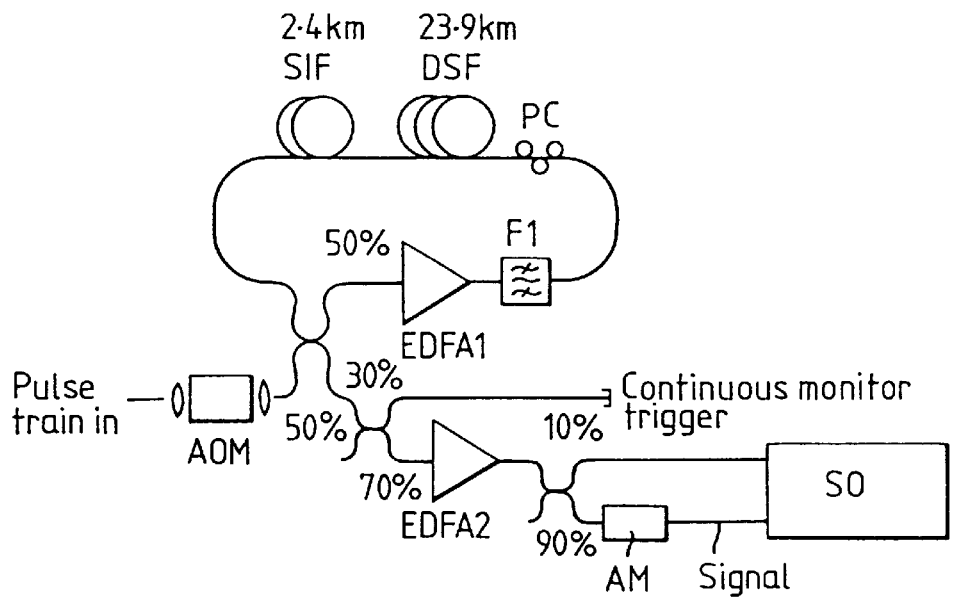
FIG. 1 is a diagram showing an optical fibre transmission system.

FIG. 1 of the drawings shows an arrangement in which signals are passed by way of an acousto-optic modulator AOM and a four-port coupler to a recirculating loop L including erbium-doped fibre amplifier EDFA1. Measurements were made using 23.9 km of dispersion shifted fibre (DSF) with a dispersion zero $\lambda_0 = 1556$ nm and 2.4 km of standard telecommunications step-index fibre (SIF). This combination gave a net dispersion zero over a single amplifier span at 1537 nm and a loop fill time of 125.6 $\mu$s. The saturable absorber mechanism used was that of nonlinear polarisation rotation (NPR) in the transmission fibre with the polarising element being a 3 nm Fabry-Perot bandpass filter F1. The filter was measured as having a ~1.5 dB polarisation dependent loss. A polarisation controller PC was included to set the required polarisation state. Measurements were made using a sampling oscilloscope SO fed through a second erbium-doped fibre amplifier EDFA2 and a lithium niobate amplitude modulator AM. The numerals represent the signal splits at the various ports.

Figure 3:
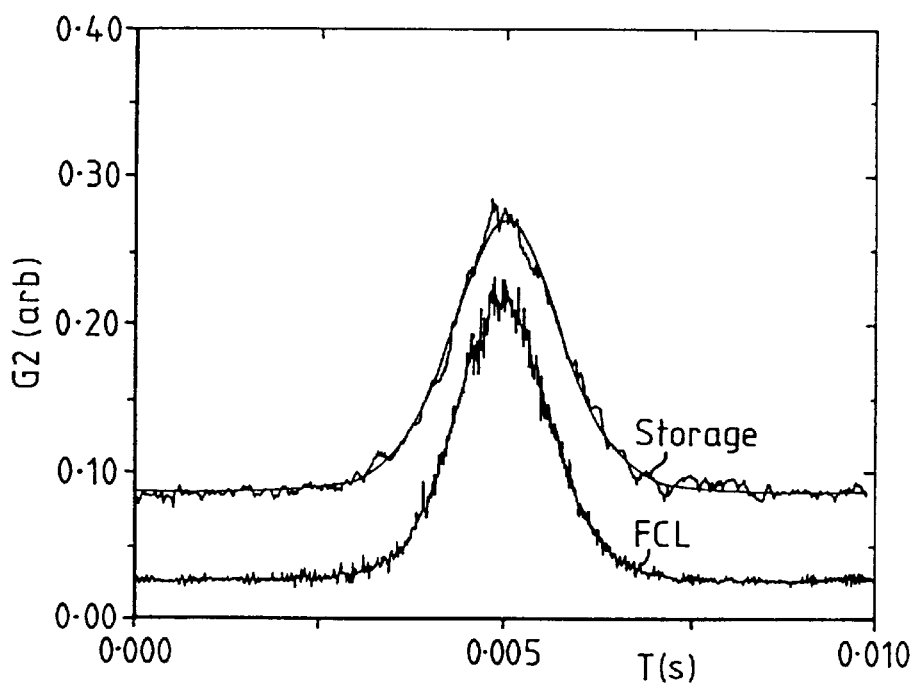
FIG. 3 shows autocorrelation traces of input and "stored" pulses with $\text{sech}^2$ curve fits.
Figure 4:
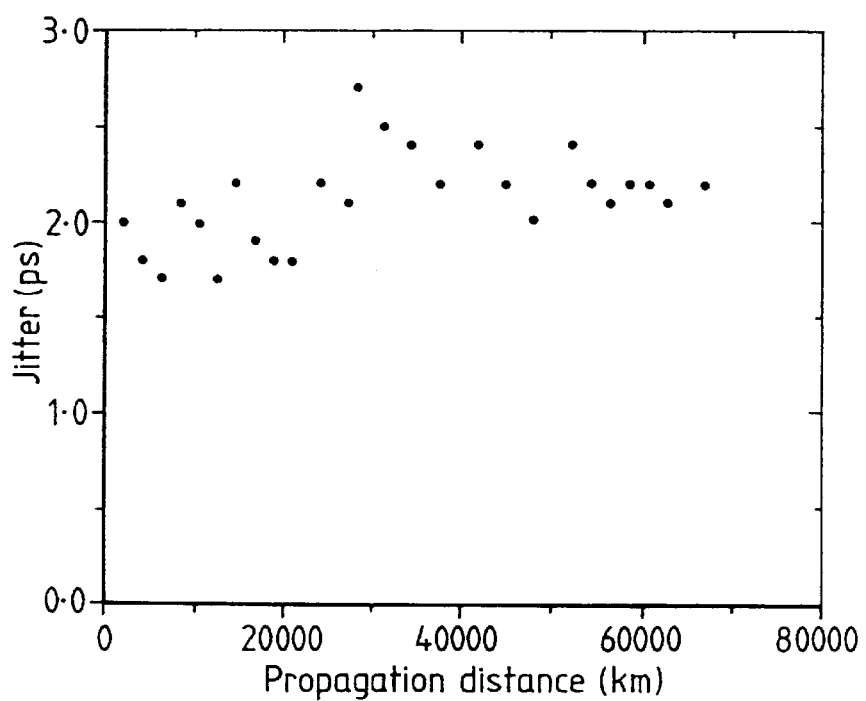
FIG. 4 shows standard deviation $\sigma$ of timing jitter averaged over 1000 km against distance.

A 123.6 $\mu$s pulse train from an F-centre laser operating at 76 MHZ was injected into the recirculating loop. It was found that with the appropriate polarisation setting the amplified spontaneous emission (ASE) noise level could be made to saturate with distance, to the point that signal propagation could be "stored" virtually indefinitely to produce a return-to-zero pulse 'storage ring'. Although slightly broadened from 9.5ps to 11ps (FWHM), the pulses remained a good approximation to the input $\text{sech}^2$ profile (see FIG. 3). These pulses could be maintained in shape for >½H, this being limited only by environmental changes. With the input signal wavelength centred on the average $\lambda_0$ of the transmission line, the observed timing jitter did not appear to increase significantly with distance as shown in FIG. 4, for up to 70 Mm. The loop control electronics could be disabled effectively to produce an RZ pulse "storage ring" as even after 7 seconds (~1450 Mm), $\sigma$ was only 8ps. For longer signal wavelengths the jitter increased significantly. The average power level within the loop was far in excess of that expected for fundamental solitons.

Figure 2:
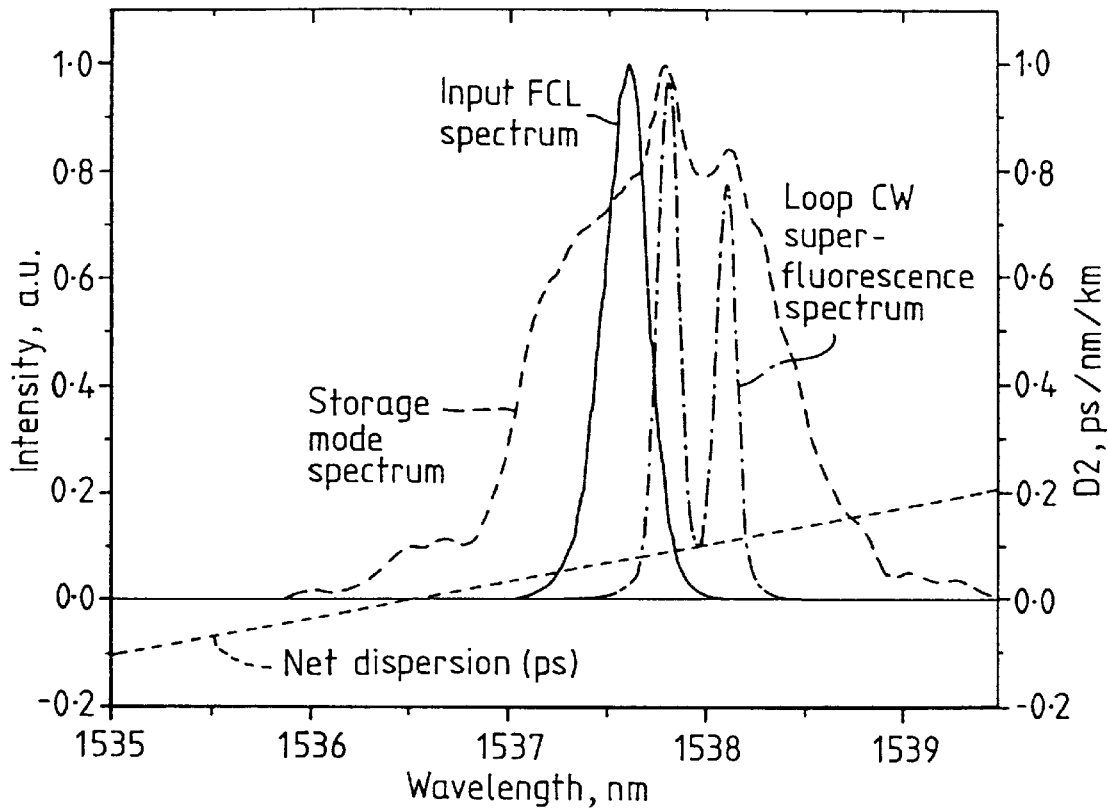
FIG. 2 is a diagram showing various spectra.

FIG. 2 shows the various spectra of the input FCL pulses, the recirculating loop superfluorescence (no signal injection) and the loop output when running as a storage ring. The input pulses, which were injected at 1537.3nm, spectrally broadened until reaching the stable spectra shown for the storage ring. The two peaks in this spectrum correspond to those of the loop superfluorescence and are the result of the polarisation dependence of the filter. The average power at the end of the transmission fibre was 71$\mu$W. Taking the dispersion for the pulse centre wavelength to be 0.1ps/nm/km, the corresponding expected soliton power is only 0.65$\mu$W. Thus this cannot be purely average soliton propagation, since for N≈10 solitons, the signal will tend to break up after only a short transmission due to the onset of self-Raman shift. These comparatively high optical powers lead, through self-phase modulation, to the large spectral broadening shown.

Operating in this regime, the observed timing jitter did not appear to increase significantly over global distances, as shown in FIG. 4 for up to 70Mm. Indeed, even after 7s (~1450Mm), the measured standard deviation of the timing jitter $\sigma$ was only 8ps. (Owing to the low repetition rate, the accumulated jitter over 1000km following the required propagation distance was measured to reduce the acquisition time.) As the trigger for these jitter measurements was taken optically from a neighbouring pulse and, thus, also jittered, these values are an overestimate by a factor of $\sqrt{2}$. For longer signal wavelengths, the jitter increased significantly with propagation distance.

When operated as a storage ring, the amplifier pump power could be lowered to remove some pulses from the stored train, effectively imposing data on the recirculating loop. These remaining pulses would be supported at these or higher pump powers. Data storage is therefore possible with such an arrangement.

In summary we have demonstrated a novel RZ pulse propagation mode with the use of NPR as a saturable absorber combined with operation at the AO of the loop (average zero dispersion over one amplifier spacing) and the propagation of ~10 ps pulses over 10's Mm with no significant increase in timing jitter. This result indicates that data rates >10 Gbit/s will be sustainable for almost indefinite distances using such techniques.

What is claimed is:

1. An optical communication system, comprising:
   an optical fiber carrying input optical signal data;
   a recirculating loop optically coupled to said optical fiber; and an optical fiber optically coupled to said recirculating loop carrying output optical signal data from said recirculating loop;

wherein said recirculating loop comprises a saturable absorber and a signal amplifier span, wherein said signal amplifier span comprises a step-index optical fiber and a dispersion shifted optical fiber, said signal amplifier span providing substantially zero average dispersion of a signal pulse that traverses said amplifier span once.

2. A return to zero pulse optical communication system including an amplifier span, comprising:

a first length of optical fiber, a fast saturable absorber and an optical amplifier, wherein in order to reduce timing jitter, a second length of optical fiber is provided in order to reduce net dispersion towards zero in the amplifier span, and wherein the fast saturable absorber comprises one of said first and second lengths of optical fiber, exhibiting non-linear polarization rotation, and a polarization element.

3. An optical communication system according to claim 2, wherein the fast saturable absorber provides a relatively low power loss between high optical powers and low optical powers.

4. An optical communication system according to claim 2, wherein the fast saturable absorber provides a 1.5 dB loss between high and low absorption states.

5. An optical communication system according to claim 4, further comprising a polarization controller that sets the polarization state of the fiber.

6. An optical communication system according to claim 2, wherein the first length of optical fiber is a stepped index fiber and the second length of optical fiber is a dispersion shifted fiber.

7. An optical communication system according to claim 2, wherein said polarization-sensitive element comprises a Fabry-Perot band-pass filter.

8. An optical communication system according to claim 2, wherein said polarization element selectively transmits light having a first polarization angle and attenuates light having a second polarization angle.

9. A return to zero pulse optical communication system including an amplifier span, comprising:

a first length of optical fiber, a fast saturable absorber and an optical amplifier, wherein in order to reduce timing jitter, a second length of optical fiber is provided, said second length of optical fiber reducing net dispersion towards zero in the amplifier span, and wherein the fast saturable absorber provides a relatively low power loss between high optical powers and low optical powers.

10. An optical communication system according to claim 9, wherein the fast saturable absorber provides a 1.5 dB loss between high and low absorption states.

11. An optical communication system according to claim 9, wherein the fast saturable absorber comprises one of said first and second lengths of optical fiber, exhibiting non-linear polarization rotation, and a polarization element.

12. An optical communication system according to claim 11, further comprising a polarization controller, wherein said polarization controller sets the polarization state of the fiber.

13. An optical communication system according to claim 11, wherein the polarization element comprises a Fabry-Perot band-pass filter.

14. An optical communication system according to claim 9, wherein the first length of optical fiber is a stepped index fiber and the second length of optical fiber is a dispersion shifted fiber.

* * * * *